United States Patent [19]

Ellis

[11] 3,945,720

[45] Mar. 23, 1976

[54] MAP DISPLAYS

[75] Inventor: Stafford Malcolm Ellis, Maidstone, England

[73] Assignee: Elliott Brothers (London) Limited, England

[22] Filed: Apr. 29, 1974

[21] Appl. No.: 464,839

[30] Foreign Application Priority Data

Apr. 30, 1973 United Kingdom............... 20397/73

[52] U.S. Cl..................................... 353/12; 353/11
[51] Int. Cl.²................... G03B 21/00; G03B 21/10
[58] Field of Search............................... 353/11, 12

[56] References Cited
UNITED STATES PATENTS

| | | | |
|---|---|---|---|
| 2,785,600 | 3/1957 | Back | 353/11 |
| 3,175,460 | 3/1965 | Honick | 353/12 |
| 3,208,336 | 9/1965 | Vago | 353/12 |

*Primary Examiner*—Richard E. Aegerter
*Assistant Examiner*—Larry Jones
*Attorney, Agent, or Firm*—Kirschstein, Kirschstein, Ottinger & Frank

[57] ABSTRACT

A topographical map display device for a vehicle, such as an aircraft, wherein a map in miniaturized form is carried on a carriage coupled to a frame by way of a mechanism which permits translational planar movement only of the carriage with respect to the frame and an image of an area of the map is projected onto a display surface on which a fixed datum represents the vehicle position, the carriage being moved with respect to the frame by actuator means in dependence on the range and bearing of the vehicle with respect to a ground-fix position so that the image of the map projected onto the display device changes progressively with vehicle movement whilst maintaining a fixed orientation.

6 Claims, 9 Drawing Figures

MAP DISPLAYS

This invention relates to topographical map displays.

The invention relates particularly to topographical map display devices for use in a vehicle e.g. an aircraft wherein the geographical position of the vehicle is indicated on the map as the vehicle moves through the region represented by the map.

One disadvantage of the simpler forms of such display devices is that the orientation of the map changes as the position of the vehicle changes.

It is an object of the present invnetion to provide a topographical map display device of simple form wherein this difficulty is overcome.

According to the present invention a topographical map display device for use in a vehicle comprises: a frame; a carriage adapted to carry a topographical map in miniaturised form; a mechanism which couples the carriage to the frame and permits translational planar movement only of the carriage with respect to the frame; a display surface; an optical projection system operable when a map is being carried by the carriage to project in magnified form on to the display surface the image of an area of the map; actuator means coupled to the carriage and to the frame and actuable in response to signals representing range and bearing of the vehicle with respect to a ground-fix position so that when a map containing a representation of the ground-fix position is being carried by the carriage, the carriage moves under the control of the range and bearing signals so that the area of the map which is projected to form an image on the display surface changes progressively with vehicle movement; and a fixed predetermined datum on the display surface which represents in relation to the progressively changing image the present geographical position of the vehicle.

In one particular embodiment of the display device in accordance with the invention, the carriage is adapted to carry a magazine which holds a plurality of topographical maps in miniaturized form and which is displaceable at will with respect to the carriage so as to permit any desired map to be brought to a position at which the map intercepts the optical axis of the optical projection system.

Preferably between the carriage and the magazine there is a magazine indexing arrangement permitting displacement of the magazine with respect to the carriage and serving in the location of the magazine in any one of a plurality of discreet positions with respect to the carriage so as to assist in retaining the magazine and hence a selected map against movement with respect to the carriage.

The indexing arrangement suitably comprises at least one male part and a plurality of female parts with the magazine displaceable towards and away from the carriage so as to permit engagement and disengagement respectively of the male and female parts and hence of the magazine and the carriage.

A spring biassing arrangement is suitably provided for biassing the magazine towards the carriage; and for this purpose there may be provided a leaf spring attached at one end to the carriage and at the other end bearing against the magazine.

The mechanism permitting movement of the carriage with the respective frame may comprise a system of pivotally connected links, certain links being pivotally connected to the frame and certain other links being pivotally connected to the carriage and the articulation of links being such that the carriage is capable of translational planar movement only with respect to the frame.

The actuator means may comprise an element coupled to the frame and rotatable about one axis; a threaded member supported by the element and rotatable about an axis perpendicular to the said one axis; a nut engaged with the said threaded member and coupled to the carriage; a first prime mover controlled by signals representing bearing of the vehicle with respect to a ground-based transmitter; a second prime mover controlled by signals representing range of the vehicle with respect to the ground-based transmitter; a first rotary mechanical transmission coupling the first prime mover to the frame coupled element; a second rotary transmission coupling the second prime mover to the threaded member; and means decoupling the first transmission from the second so as to prevent rotation of the threaded member as a result of rotation of the framed couple element.

The invention also extends to a magazine which holds a plurality of topographical maps in miniaturised form and which is adapted to be carried in a display device as herein described.

The above and other features of the map display device are hereinafter described with reference to the accompanying drawings in which.

The display device is designed for use in an aircraft.

Figure 1:
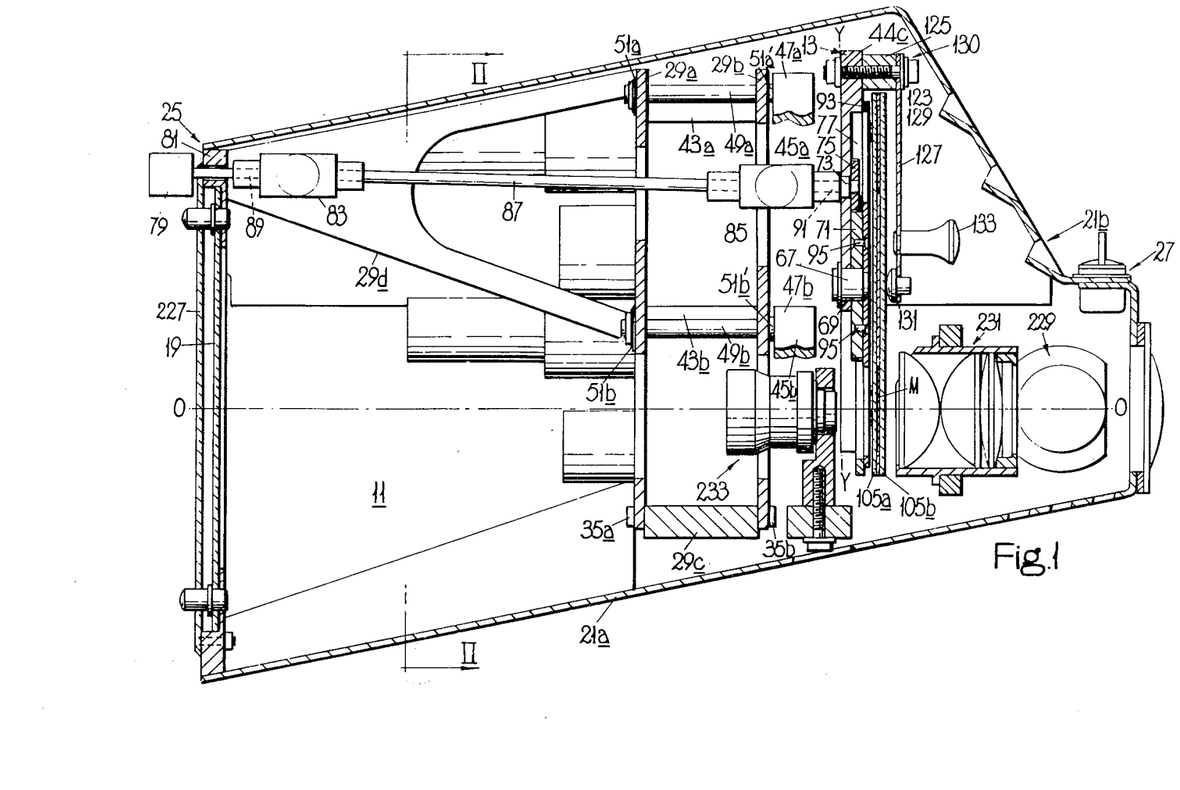
FIG. 1 is a diagram showing a longitudinal section through the device.
Figure 7:
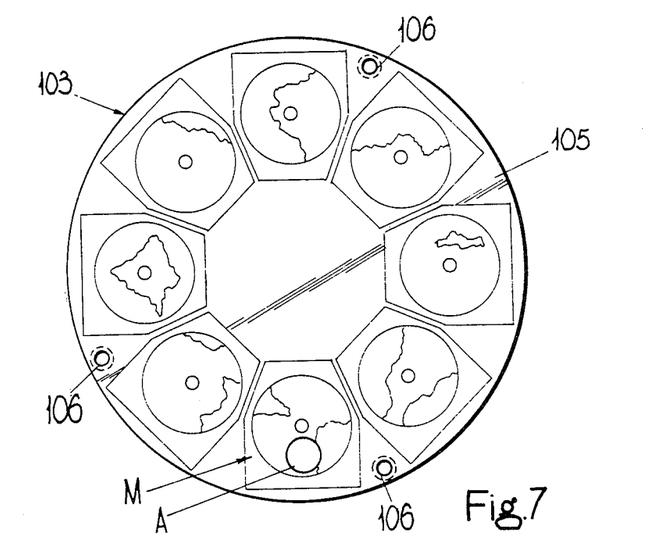

Referring particularly to FIG. 1 of the drawings, the basic elements of the device are: a frame 11; a carriage 13 adapted to carry a map, eg. M in the form of a micro-transparency; a mechanism 15 which couples the carriage 13 to the frame 11 and which permits translational planar movement only of the carriage 13 with respect to the frame 11; actuator means (FIG. 3) coupled to the carriage 13 and to the frame 11 and actuable in response to signals representing range and bearing of the aircraft in which the device is carried, with respect to a ground-fix position so as with change in range and bearing of the aircraft to effect a progressive displacement of the carriage 13 with respect to the frame 11; a display surface in the form of a ground-glass screen 19; and an optical projection system 20 operable when a map micro-transparency M is being carried by the carriage 13 to project a magnified form on to the ground-glass screen 19 the image of an area as A (FIG. 7), of the map micro-transparency.

The device has a housing 21 in two parts, a lower part 21a and a cover 21b hingedly connected at 25 at the forward end of the cover 21b to the lower part 21a. The rear end of the cover 21b is releasably connected to the lower part 21a by an easily releasable fastening means 27.

The frame 11 comprises the housing 21 and internal frame members 29a 29b 29c and 29d. The frame members 29a and 29b are parallel plates, being supported parallel to one another by the frame members 29c and 29d and fasteners securing all of the frame members 29a 29b 29c and 29d to the housing 21. As may be seen, the frame member 29c consists of a bar of rectangular cross-section which extends between the frame members 29a and 29b and which is secured by bolts 31a and 31b to the side walls 33a and 33b of the housing 21. The frame members 29a and 29b are secured by bolts 35a and 35b to the frame member 29c and to the side wall 37 of the housing 21 by bolts 39. Extending between the parallel plates 29a and 29b there are cylindrical pillars 43a and 43b which serve inter alia to assist in maintaining parallelism of the said plates. The frame member 29d is secured to the plate 29a and to the housing.

Figure 5:
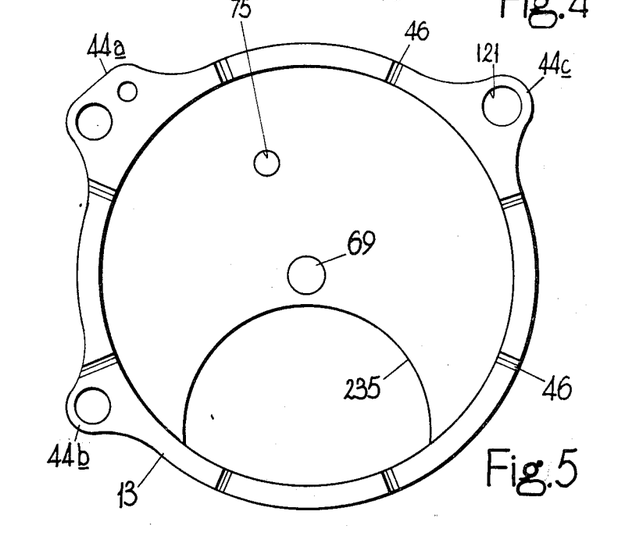

Referring also to FIG. 5, the carriage 13 consists essentially of a plate which is of generally circular shape though formed with three ears 44a 44b and 44c. A plurality of spaced apart grooves 46 are in one face of the carriage 13 adjacent to the periphery thereof. As will be explained hereafter the grooves 46 constitute elements of a magazine indexing arrangement.

Figure 2:
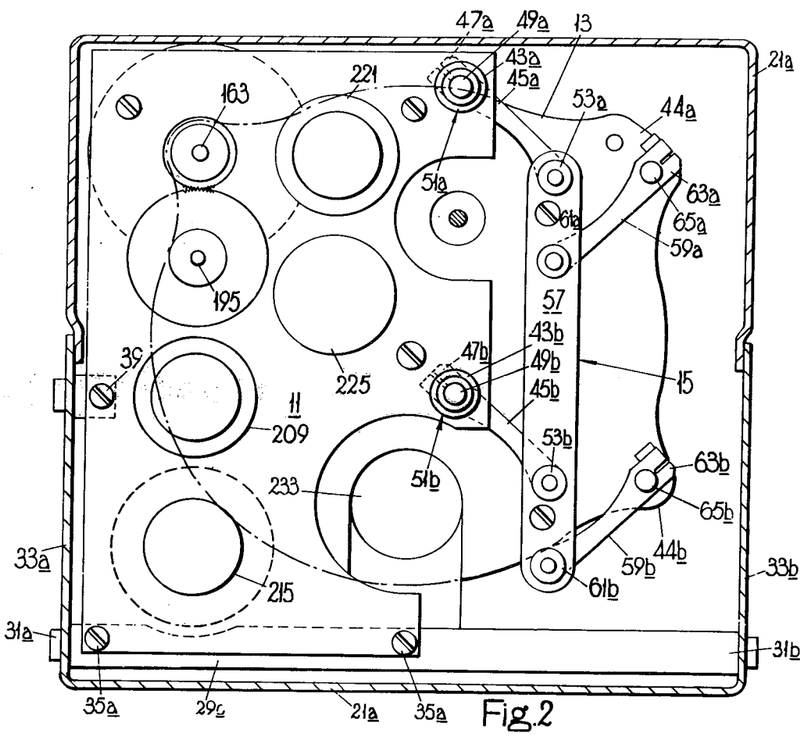
FIG. 2 is a diagram showing a transverse section through the device.

Referring particularly to FIG. 2, the mechanism 15 consists of a system of pivotally connected link elements.

Two, 45a and 45b, of the link elements are clamped each at one end 47a 47b respectively to pivot pins 49a 49b which extend through the pillars 43a 43b respectively and which are freely rotatable in bearings 51a 51b, 51a', 51b' between the link elements and the frame members 29a, 29b. The other ends 53a 53b of the link elements 45a 45b are pivotally connected to an intermediate link element 57. Two other link elements 59a, 59b are each pivotally connected at one end 61a, 61b to the element 57 and at the other end 63a, 63b are connected to pivot pins 65a, 65b respectively projecting from apertures in the ears 44a and 44b of the carriage. The pivot pins 65a, 65b are freely rotatable in bearings (not shown) with respect to the carriage 13.

The articulation of the system of link elements 45a, 45b, 57, 59a and 59b, the frame 11 and the carriage 13 is such that the carriage 13 is capable of translational planar movement with respect to the frame 11 parallel to the plane containing the line Y—Y (FIG. 1) and perpendicular to the plane of the figure.

A bearing member 67 projects from a central aperture 69 in the carriage 13. The member 67 carries a sun-gear 71 rotatable about the member 67. Another bearing member 73 projects from an aperture 75 in the carriage 13. The member 73 carries a planetary gear 77 which meshes with the sun-gear 71.

Bearing member 73 and gear 77 are connected to a manually rotatable map selector knob 79 on the front panel 81 of the housing 21 by way of first and second universal joints 83, 85, respectively, inter-connecting shaft 87 and stub-shafts 89, 91.

Figure 6:
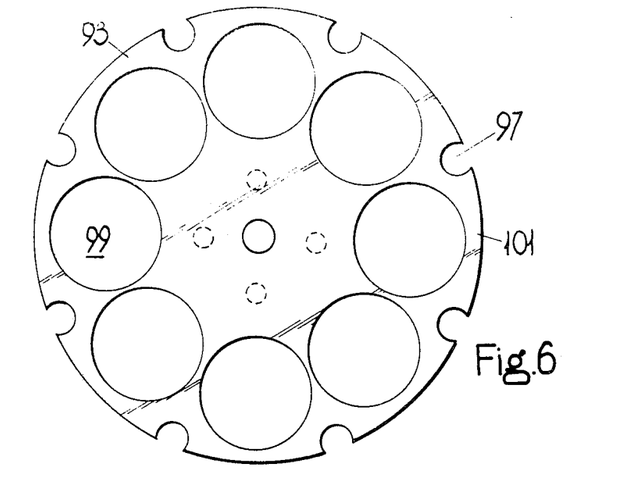

A map selector plate 93 is secured by rivets 95 to the sun-gear 71. The map selector plate 93 is best shown in FIG. 6 where it may be seen that the plate, whilst being of generally circular shape, has peripheral notches 97 corresponding in number and distribution to the grooves 46 in the carriage 13. Further, plate 93 has circular apertures, as 99, equal in number to the notches 97 and the centres of which lie on a pitch circle about the centre of the plate. The radii through the centres of the apertures 99 bisect the circular arcs 101 between the notches 97.

A map holder or magazine 103 is supported in a plane parallel to the indexing plate 93. The magazine, see particularly FIG. 7, consists of two parallel glass plates 105a, 105b and, between the glass plates, map micro-transparencies M equal in number and distribution corresponding in position with the circular apertures 99 in the indexing plate 93. The glass plates 105a, 105b are secured together by adhesive around their peripheries, trapping the micro-transparencies M.

Figure 4:
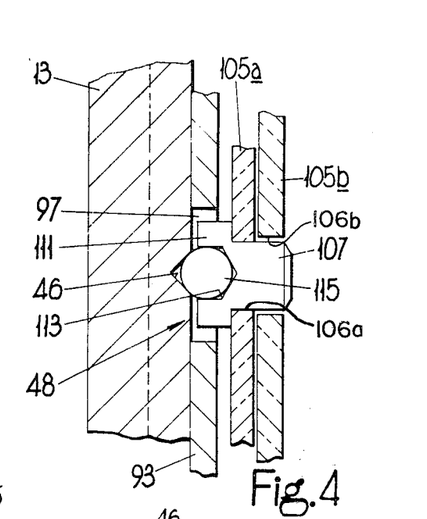
FIGS. 4 to 8 are diagrams showing other features of the device.

The glass plates 105a, 105b are provided with three apertures 106 (106a in plate 105a and 106b in plate 105b) through which extend the shanks of three studs 107 which constitute elements of the magazine indexing arrangement 48 shown in FIG. 4. The studs have an interference fit with the walls of the aperture in one of the plates 105a. The stud heads 111 extend through correspondingly located notches 97 in the indexing plate 93.

The stud heads 111 each have a recess 113 within which is retained, by adhesive means, a ball 115. The ball 115 projects proud of the stud heads 111 and enter correspondingly located grooves 46 in the carriage 13.

The magazine 103 is therefore held against rotation by contact of the balls 115 with the inclined walls of the grooves 46 and against lateral movement by contact between the stud heads 111 and the bottom wall portion of the correspondingly located notches 97 in the selector plate 93.

The ear 44c of the carriage 13 has an aperture 121 (see FIG. 1). A bolt 123 which projects through the aperture 121, carries a cylindrical pillar 125. A leaf spring 127 is trapped, at one end, between an end surface of the pillar 125 and a washer 129 under the clamping force of a nut and lock washer arrangement 130. The other end of the leaf spring 127 carries a nylon pressure pad 131 which under pressure exerted by the leaf spring 127 bears against the glass plate 105b. A knob 133 is provided to facilitate release of the pressure pad from the cover plate when it is desired to remove or insert a magazine 103.

Rotation of the map selector knob 79 rotates the planetary gear 77 by way of the mechanical transmission including the universal joints 83, 85. Rotation of the planetary gear 77 rotates the sun-gear 71 the balls 115 riding up one or the other of the inclined walls of the grooves 46 in dependence upon the sense of rotation of the knob 79.

The resultant axial movement of the studs 107 produces a corresponding limited axial movement of the magazine 103 against the bias of the pressure pad 131. During continued rotation of the knob 79 the balls 115 slide in contact with the carriage 13 until they drop, under pressure pad bias, into the next adjacent grooves in the carriage 13.

The actuator means (FIG. 3) comprises a member 135 which is connected to the carriage 13 and rotatable about an axis R—R with respect thereto.

Figure 3A:
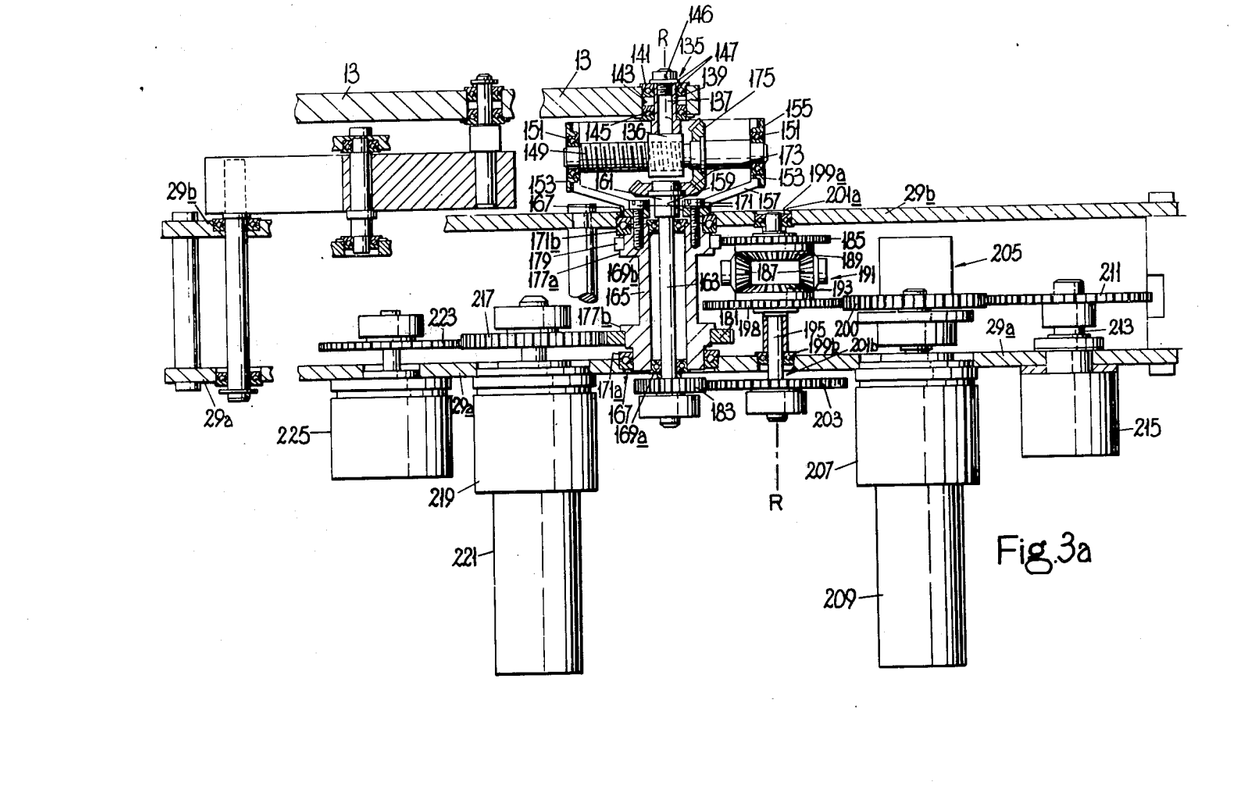
FIGS. 3a and 3b are diagrams showing in some detail certain features of a mechanism contained within the device.

In greater detail the member 135 comprises a nut 136 provided with a lateral projecting threaded portion 137. A cylindrical sleeve 139 which surrounds the portion 137 extends through a bearing 141 in an aperture 143 of the carriage 13. The sleeve 139 has a shoulder 145 which contacts the bearing 141. A nut 146 engages the threaded portion 137 and the sleeve 139 is trapped between a washer 147 and the shoulder 145.

The nut 136 (see particularly FIG. 3b) engages a threaded spindle 149 which is supported in bearings 151 located in diametrically opposed apertures 153 in a ring member 155. The latter member is supported by a spider 157 a central aperture 159 of which surrounds an enlarged portion 161 of the shank of a spindle 163.

Figure 3B:
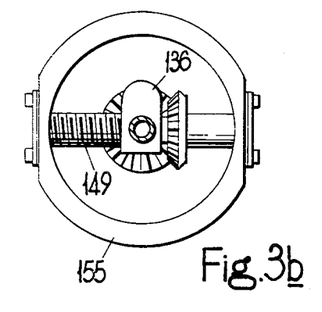

The spindle 163 extends through aligned openings 167 in the frame members 29a, 29b and is supported with respect to a generally cylindrical member 165 which surrounds the spindle by bearings 169a and 169b secured to the end surfaces of the cylindrical member 165 surrounding the spindle 163.

The generally cylindrical member 165 is supported at its ends in bearings 171a, 171b connected to the frame members 29a, 29b. The spider 157 is secured as by screws 171 to the member 165.

The enlarged portion 161 of spindle 163 has secured thereto one 173 of two bevel gears the other 175 of which is secured to the spindle 149. The member 165 has two flanges 177a, 177b. The flange 177a has secured thereto a ring gear 179; the flange 177b has secured thereto a ring gear 181. On the spindle 163 to one side of the frame member 29a there is a further gear 183.

The ring gear 179 meshes with a gear 185 secured to one crown wheel 189 of a differential gear 191, the gear 185 and the wheel 189 being together freely mounted on the main shaft 195 of the differential to which shaft the differential pinions 187 are journalled. The other crown wheel 193 of the differential is similarly secured to a further gear 198, and the gear 198 and wheel 193 are together freely mounted on the main shaft 195. The main shaft 195 is supported in bearings 199a and 199b respectively located in aligned openings 201a and 201b in the frame members 29b, 29a, and secured to the shaft 195 on the side of the frame member 29a remote from the differential there is a further gear 203 in mesh with the gear 183.

The gear 198 meshes with yet another gear 200 carried by the driven member of a slippable clutch 205. The driving member of clutch 205 is coupled through a reduction gearing 207 to the drive member of an electric range motor 209 secured to the frame member 29a. The gear 200 also meshes with the gear 211 secured to the rotor 213 of a range back-off potentiometer 215 mounted on the frame member 29a.

The ring gear 181 meshes with a gear 217 mounted on the output shaft of a reduction gearing 219 the input of which is coupled to a bearing motor 221 also secured to the frame member 29a.

The gear 217 also meshes with a gear 223 mounted on the rotor of a bearing back-off potentiometer 225 mounted on the frame member 29a.

The range and bearing motors 209, 221 receive or are adapted to receive, as their name suggests, signals representing range and bearing respectively of the aircraft with respect to a ground-fix position. Conveniently the range and bearing signals to be supplied to the motors 209, 221 are derived by navigation receiver or receivers carried by the aircraft, in response to range and bearing signals transmitted by a ground-based transmitter such as VOR/DME or Tacan.

Figure 8:
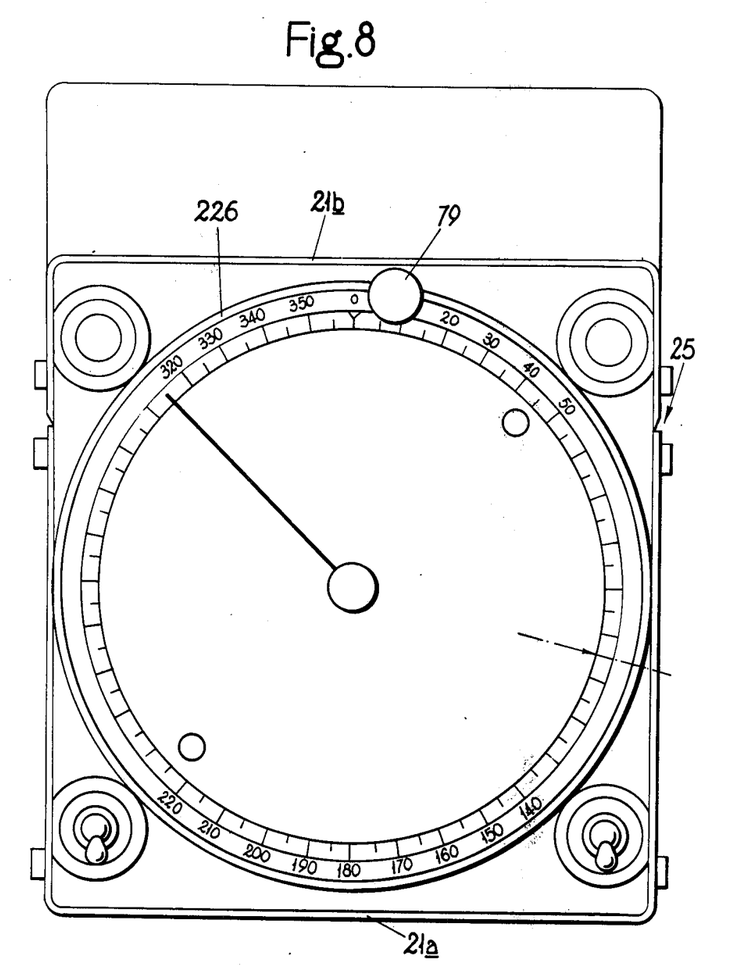

The ground-glass viewing screen 19 is fitted in an aperture in the front panel 81 of the housing 21. As shown (FIG. 8) the front panel is also fitted with a compass rose 226 marked from 0°-360°. Fresnel prism 227 is fitted to the panel 81 in front of the viewing screen 29. The Fresnel prism whilst limiting the angle for viewing the screen 19 ensures that any image projected onto the screen 19 is as bright as possible for a given optical projection system.

The optical projection system 21 comprises a lamp 229 a condenser lens arrangement 231 and a projection lens arrangement 233, the focal plane of which is the plane containing the micro-transparencies M carried by the magazine.

As may be seen (FIG. 5) the carriage 13 has an aperture 235 which is aligned with an aperture in the indexing plate 93 and with a selected micro-transparency M of the magazine. The micro-transparency M and the aperture 99 intercept the optical axis O—O of the projection system. When the lamp 229 is energized an image of a small circular area as A FIG. 7 of the selected micro-transparency M is projected on to the viewing screen 19.

Each micro-transparency M contained in the magazine 103 contains a representation of a certain geographical area across which it might be desired to navigate the aircraft. In general the totality of micro-transparencies M contains a representation of a very extensive geographical area. Typically each micro-transparency represents a geographical area of say 100 miles radius; it is therefore to be understood that the single magazine may contain a map representation of a territory equal in area to say that of the United Kingdom distributed across the eight retained map micro-transparencies depicted.

Preferably the micro-transparencies M are specially prepared so that the centre of each map is a representation of a ground-based transmitter developing range and bearing signals. This is not mandatory however; the range of movement of the carriage 13 with respect to the frame 11 is within certain limits imposed only by the practical design requirements, the limits being such that the position of the transmitter representation on a micro-transparency may be at any position within a circle of a certain radius about the centre of a selected micro-transparency M.

Assume, however, that the micro-transparencies M have their transmitter representations at the centre of the associated apertures 99 of the indexing plate 93, and assume that the plate 93 has been rotated by means of the knob 79 so that the micro-transparency M, containing a representation of a particular ground area over which the aircraft is being navigated, intercepts the optical axis O—O of the optical projection system.

Assume also that the navigation receivers carried by the aircraft are tuned to receive range and bearing signals from the ground-based transmitter whose representation is on the co-positioned micro-transparency.

Rotation of the motor 221 in response to a bearing signal supplied thereto rotates the generally cylindrical member 165 thereby rotating the spider 157 and in consequence the threaded spindle 149. Rotation of the bearing motor 221 also rotates the wiper motor of the bearing potentiometer 225 by way of the gears 217 and 223. The potentiometer output is supplied to an input of a differential amplifier included in input circuitry (not shown) to the bearing motor. The potentiometer output backs-off or tends to back-off the bearing signals supplied to another input of the differential amplifier so that when the spindle 149 is correctly orientated with respect to the frame 11, the bearing motor 221 is substantially quiescent.

In a similar manner rotation of the motor 209 in response to a range signal supplied thereto causes the spindle 149 to rotate about its longitudinal axis, the spindle 149 being driven by the motor 209 by way of the reduction gearing 207, clutch 205, gear 200, differential 191, gear 203, gear 183, spindle 163, bevel gear 173 and bevel gear 175. The nut 136 being constrained by the carriage 13, rotation of the spindle 149 causes the nut 136 to travel axially therealong. In the event that the nut 136 is displaced to an extent such that the contact occurs between the nut 136 and the ring 155, the clutch 205 slips, thereby preventing damage to the mechanism.

The differential 191 serves to decouple the bearing and range motions of the nut 136.

As may be gathered, the range motor 209 is effective to displace the nut 136 axially of the spindle 149 and has no effect on the rotation of the spider 157. On the other hand, the bearing motor 221 in rotating the spindle 149 about the axis R—R would in the absence of the differential 191 also introduce an axial movement of the nut 136 resulting from the bevel 175 rolling on the bevel 173.

As mentioned above, the gear 200 is also coupled to the gear 211 on the rotor of the range potentiometer 215. As with the bearing potentiometer 225 the output of the range potentiometer 215 is connected to one input of a differential amplifier connected in the input circuitry to the range motor 209. The output from the potentiometer backs-off or tends to back-off the range signals applied to another input of the differential amplifier so that when the nut 136 is correctly positioned with respect to the frame 11 the range motor 209 is substantially quiescent.

The movement of the nut 136 axially of the spindle in the direction assumed by the spindle in response to the bearing signal is transmitted to the carriage 13 by way of the parts 137, 139 and the bearing 141.

The carriage 13 therefore moves with respect to the frame 11 in correspondence with the movement of the nut 136, being constrained against rotation by the system of link elements coupling the carriage 13 to the frame 11.

As the carriage 13, the indexing plate 93 and the magazine 103, move with respect to the frame 11, the area A of the selected micro-transparency M which is projected by the optical projection system to form an image on the display surface 19, changes progressively with movement of the aircraft over the geographical area of which the micro-transparency M is a representation. By virtue of the constraint imposed on the carriage 13 by a system of link members the projected image of the area A has a constant eg. 'north-up' orientation with respect to the compass rose.

The gearing relating the geographical position of the aircraft as represented by the range and bearing signals from the ground-based transmitter to the position of the carriage 13 with respect to the frame 11, is such that when a map micro-transparency M containing the representation of the ground-fix position with respect to which the vehicle is being navigated is being carried by the carriage 13, the carriage moves under the control of the range and bearing signals in the aforesaid manner. Further, the gearing is such that a fixed predetermined datum D on the viewing screen 19 represents in relation to the progressively changing image projected onto the viewing screen 19 the present geographical position of the aircraft.

In effect, a fixed point on the axis of the shaft 149 corresponds to the position of the aircraft and the nut 136 corresponds to the ground-based transmitter. In operation, the nut 136 is moved with respect to the fixed point on the shaft 149 in the same manner as the transmitter appears to move with respect to the aircraft. Thus at all times the angular position of the nut 136 with respect to the fixed point corresponds to the bearing of the transmitter from the aircraft, and the distance of the nut 136 from the fixed point corresponds to the range of the aircraft from the transmitter. As a result, the point on the image of the relevant micro-transparency M on the screen 19 corresponding to the transmitter moves with respect to the datum D representing the aircraft in operation so that the datum D at all times indicates the geographical position of the aircraft on the displayed image.

Whilst a particular construction of a map display device is described hereinabove it will be appreciated that variations in the construction are possible.

In particular it might be desired instead of the system of pivotally connected link elements to employ an orthogonal slide arrangement similar in principle to slide arrangements employed in certain machine tools such, for example, as milling machines.

Further whilst the magazine 103 preferably is of unitary construction carrying, in the example described, eight map micro-transparencies M it may be desired to provide a magazine to which required map micro-transparencies may be introduced and which is adapted to accurately locate the map micro-transparencies when so introduced.

I claim:
1. A topographical map display device comprising
   A. a frame;
   B. a carriage carrying a topographical map in miniaturized form;
   C. a mechanism coupling the carriage to the frame and permitting translational planar movement only of the carriage with respect to the frame;
   D. a display surface;
   E. an optical projection system operable to project in magnified form onto the display surface the image of an area of the map;
   F. actuator means comprising
      i. an element mounted on the frame for rotation about a first axis passing through a point fixed with respect to the frame;
      ii. a threaded member mounted on said element for rotation about a second axis passing through said fixed point in a direction perpendicular to said first axis;
      iii. a nut engaged with said threaded member so as to move angularly around said first axis on rotation of said element and to move along said second axis on rotation of said threaded member:
      iv. a first prime mover controlled by signals representing bearing of a vehicle with respect to a ground-based transmitter;
      v. a second prime mover controlled by signals representing range of the vehicle with respect to the ground-based transmitter;
      vi. a first rotary mechanical transmission coupling the first prime mover to said frame mounted element;
      vii. a second rotary transmission coupling the second prime mover to the threaded member;
      viii. means decoupling the first transmission from the second so as to prevent rotation of the threaded member as a result of rotation of said frame mounted element; and
      ix. means coupling said nut to said carriage to cause movement of the carriage in its permitted plane of translational movement corresponding to movement of the nut in a plane perpendicular to said first axis and parallel to said second axis so that the area of the map which is projected to form an image on the display surface changes with the vehicle movement; and G. a predetermined datum on the display surface which represents in relation to said image the geographical position of the vehicle.

2. A display device according to claim 1 wherein the carriage carries: a magazine which is displaceable relative to the carriage; a plurality of topographical maps in miniaturized form disposed at spaced positions on the magazine; and a magazine indexing arrangement which defines a plurality of discrete positions of the magazine with respect to the carriage, in each of which positions the image of an area of a different one of the maps is projected onto the display surface by the projection system.

3. A display device according to claim 2 wherein said magazine is rotatably mounted on the carriage and said indexing means comprises at least one male part which is selectively engageable with any selected one of a plurality of female parts thereby to define a plurality of discrete angular positions of the magazine with respect to the carriage.

4. A display device according to claim 3 including a leaf spring attached at one end to the carriage and at the other end bearing against the magazine, thereby to urge said male part into engagement with the selected female part.

5. A display device according to claim 1 wherein said mechanism comprises a system of pivotally connected links, certain links being pivotally connected to the frame and certain other links being pivotally connected to the carriage and the articulation of links being such that the carriage is capable of translational planar movement only with respect to the frame.

6. A display device according to claim 1 wherein said decoupling means comprises a differential gear arrangement.

* * * * *